(No Model.)

S. WING.
PLATE HOLDER FOR PHOTOGRAPHIC CAMERAS.

No. 361,388. Patented Apr. 19, 1887.

Witnesses
J. Thomson Cross
J. W. Dowe

Inventor
Simon Wing.
By his Attorney A. G. Heylman.

UNITED STATES PATENT OFFICE.

SIMON WING, OF BOSTON, MASSACHUSETTS.

PLATE-HOLDER FOR PHOTOGRAPHIC CAMERAS.

SPECIFICATION forming part of Letters Patent No. 361,388, dated April 19, 1887.

Application filed November 29, 1886. Serial No. 220,158. (No model.)

*To all whom it may concern:*

Be it known that I, SIMON WING, a citizen of the United States of America, residing at Boston, (Charlestown,) in the county of Suffolk, in the State of Massachusetts, have invented a new and useful Plate-Holder for Photographic Cameras, of which the following is a specification.

My invention has relation to improvements in apparatus for holding photographic sensitized plates; and the object is to provide a plate-holder that is light tight, more compact, lower priced, and more convenient than any now in use.

My invention consists in the novel construction of parts and their combination, as hereinafter described, and specially as the same is pointed out in the claims made thereto.

I have clearly and fully demonstrated my invention in the accompanying drawings, forming a part of this specification, wherein—

Figure 1:
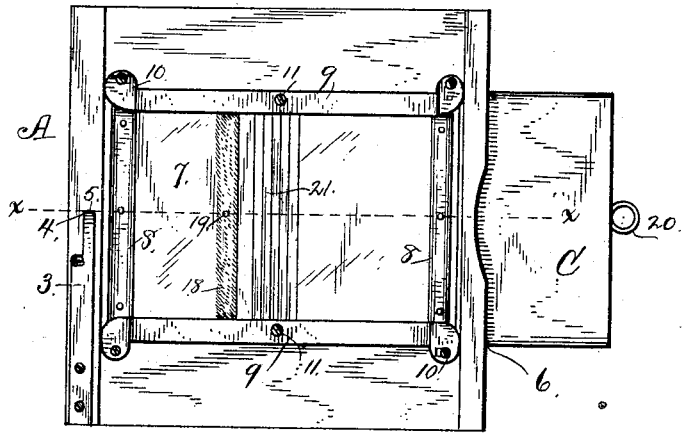
Figure 2:
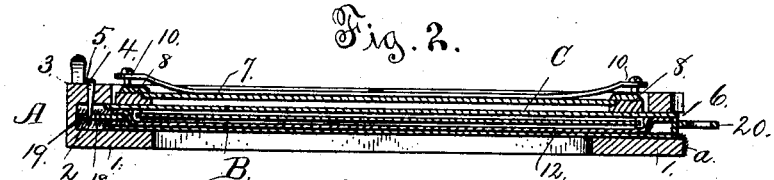
Figure 3:
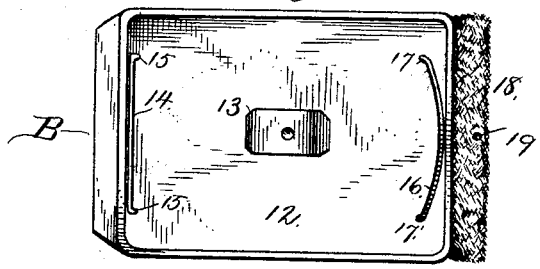
Figure 4:
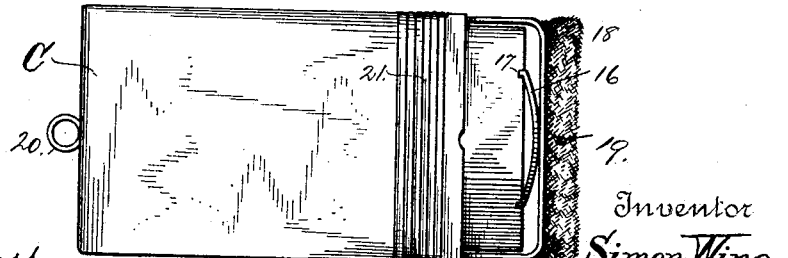

Figure 1 is a front view of the plate-holder end of a camera. Fig. 2 is a transverse sectional view of the plate-holder end of the camera, taken on the line $x\ x$ of Fig. 1, and showing the latch end of the spring-catch, the sensitized plate, and the dark shell, the parts being shown on a larger scale than in other figures. Fig. 3 is a view of the sensitized-plate-pan; and Fig. 4 shows the dark shell, the two in combination forming the plate-holder.

In the drawings the same parts are denoted by similar notations, and reference being had thereto, the letter A designates the plate-holding end or frame of a camera, which may be of any of the approved constructions, and adapted to take a slide or plate-holder carrying the prepared plate. It is here shown as being formed with flanges 1 and end recess or groove, 2. On the closed end of the frame A may be secured a latch, 3, with a catch end, 4, let through an opening, 5, in the frame to set across the end groove and hold the sensitized-plate pan in the frame. In the end piece of the frame A is the opening 6, through which the plate-holder is inserted. On the inner piece of the opening in the frame A is secured a covering, $a$, with a yielding surface—as a heavy villous material or other proper substance—to exclude all possibility of light entering from that direction. The ground glass 7 may be held in a frame, 8, and the frame with the glass given adjustment by means of springs 9, having ears 10 secured to the frame A of the camera, and the middle of the springs secured to the frame of the glass, as at 11. The holes in the ears of the screws are elongated to give the springs movement.

The letter B designates one part of the dry-plate holder. This consists of a shallow pan, 12, with turned-up edge flanges slightly flared to take the plate readily and also to fit in the flared edges of the outside shell. In the middle of the shallow pan may be secured a bent-up spring, 13, or other device to push up and hold the sensitized plate, and in one end of the pan may be secured a keeper, as 14, having inwardly-projecting lugs 15, to set over the sensitized plate when in place. In the other end of the pan a spring, 16, may be secured at its middle to the flange of the pan, and arranged to exert its force in the direction of the opposite end of the pan, the spring 16 being formed with projecting lugs 17, to set over the plate and keep it from displacement. The plate can then be inserted by setting one end under the lugs of the spring 16, then the other end being pressed down and allowed to slip under the lugs of keeper 14, the plate being thus held in the pan.

On the end of the sensitized-plate pan is secured a flange-piece, 18, to serve as a plug to the open end of the dark-shell to exclude the light, and which may have a hole, 19, in the middle to take the end of the latch fixed on the frame A and hold the plate-pan in position while the dark-shell is being drawn out of the frame and off the plate-pan. Now, by removing the lens-cap the plate will be exposed. The flange 18 is provided with a covering having a yielding surface—as a textile material having a villous finish or other suitable material—so that when inserted in the dark-shell the light is entirely excluded.

The letter C designates the dark-shell for holding the plate-pan. This consists of a sheet-metal box of the form shown in the drawings, having the sides and one end closed and one end open. The closed side edges may be made flaring to take the flared flanges of the plate-pan. On the closed end may be secured a finger-piece, 20, by which the dark-shell is withdrawn from the plate-pan. Adjacent to the open end is preferably formed a series of corrugations or crimps, 21, extended entirely around the shell, substantially as shown in the drawings. These corrugations are essential, in connection with the plush on the flange of the sensitized-plate pan, for assuring the exclusion of light, since the nap of the plush rises into the corrugation and effectually excludes all actinic effects. By making the edges of the dark-shell and the plate-pan correspondingly flared the exposed side of the prepared plate may be always known. The prepared plate can be fitted in a plate-pan and then pushed into the dark-shell and placed in a carrying-case large enough to carry any number desired.

When the operator desires to use a plate, the dark-shell, with its contents, is slid in the frame A of the camera, the catch of the frame entering the hole in the flange of the sensitized-plate pan. The dark-shell is then withdrawn, the picture taken, the dark-shell again pushed over the pan holding the plate, the latch released, and the shell, with its contents, withdrawn from the camera and restored to the carrying-box, where it can remain to suit the convenience for perfecting the picture.

It will be seen that the sensitized plate has been subjected to light only for the time to effect the image, and that both before and after the operation it is absolutely safe from any actinic action.

What I claim as my invention, and desire to secure by Letters Patent, is—

1. In a photographic-plate holder, the dark-shell herein described, consisting of a sheet-metal box having an open end and formed with corrugations or crimps extended entirely about it near the open end thereof, substantially as described, and for the purpose specified.

2. In a photographic plate-holder, the dark-shell herein described, consisting of a sheet-metal box having an open end and flared side edges, and provided with corrugations extended entirely about it near the open end thereof, substantially as described, and for the purpose specified.

3. The photographic-plate holder consisting of an outside shell or sheath consisting of an integral sheet-metal box having an open end, and a plate-receptacle adapted to fit within and be held by said box, and provided with a plug covered with a yielding material to set within and close the end of the shell, substantially as described.

4. The photographic-plate holder consisting of an outside shell or sheath having an open end and formed with corrugations extended about it, and a plate-receptacle formed to slide within the shell and formed with an end plug covered with yielding material to set within and close the open end of the shell, substantially as described.

5. The sensitized-plate carrier consisting of a shallow pan with a flange on its end provided with a covering having a yielding surface, substantially as described.

6. The sensitized-plate receiver consisting of a shallow pan with turned up and out edges, and provided with a flange on its end covered with a textile material having a villous finish, substantially as described.

7. The sensitized-plate receiver consisting of a dish-shaped plate provided with an end flange covered with a yielding material and having a central spring, a plate-keeper secured on the end flange of the plate-holder, and a holding-spring with projecting ends secured in the other end of the holder, substantially as described, and for the purpose stated.

8. The combination of the dark-shell consisting of a sheet-metal box having an open end and formed with corrugations or crimps extended entirely about it near the open end, with the sensitized-plate pan formed with a broad end flange covered with a material having a yielding surface, and provided with a hole to engage a catch in the camera, substantially as described, and for the purpose stated.

9. The combination, with a camera-frame provided with a latch, of a sensitized-plate pan formed with a flange at its outer end provided with a yielding covering, and an aperture to take the latch on the camera, and a dark-shell consisting of a sheet-metal box with an open end, and formed with corrugations or crimps extended entirely about it near its open end, and a finger-piece secured to the closed end on the dark-shell, all substantially as described, and for the purpose stated.

In witness whereof I have hereunto set my hand in the presence of two attesting witnesses.

SIMON WING.

Attest:
ALFRED L. MOODY,
LESTER E. MANSON.